United States Patent
Gottung et al.

(10) Patent No.: US 7,883,558 B2
(45) Date of Patent: Feb. 8, 2011

(54) ELECTROSTATIC PARTICULATE SEPARATION FOR EMISSION TREATMENT SYSTEMS

(75) Inventors: Eric J. Gottung, Westmont, IL (US); Bruce H. Easom, Groton, MA (US); Sergei F. Burlatsky, West Hartford, CT (US); Leo A. Smolensky, Concord, MA (US); Luca Bertuccioli, East Longmeadow, MA (US)

(73) Assignee: United Technologies Corporation, Hartford, CT (US)

( * ) Notice: Subject to any disclaimer, the term of this patent is extended or adjusted under 35 U.S.C. 154(b) by 371 days.

(21) Appl. No.: 12/116,334

(22) Filed: May 7, 2008

(65) Prior Publication Data

US 2009/0277325 A1 Nov. 12, 2009

(51) Int. Cl.
*B03C 3/14* (2006.01)

(52) U.S. Cl. .............. 55/315; 95/58; 95/63; 95/78; 96/55; 96/61; 96/63; 96/74

(58) Field of Classification Search .......... 96/55, 96/57, 58, 60, 61, 77, 62, 63, 74; 95/63, 95/69, 70, 78, 79, 58; 55/315
See application file for complete search history.

(56) References Cited

U.S. PATENT DOCUMENTS

| | | | | |
|---|---|---|---|---|
| 3,898,408 | A * | 8/1975 | Cookson et al. | 218/43 |
| 4,003,836 | A | 1/1977 | Stearns | |
| 4,010,011 | A * | 3/1977 | Reif | 96/61 |
| 4,141,698 | A * | 2/1979 | Kihlstedt et al. | 95/69 |
| 4,183,208 | A | 1/1980 | Horgan | |
| 4,478,039 | A | 10/1984 | Horgan | |
| 4,478,613 | A * | 10/1984 | Brettschneider et al. | 96/61 |
| 4,649,703 | A * | 3/1987 | Dettling et al. | 60/275 |
| 4,689,951 | A * | 9/1987 | Polach | 60/275 |
| 4,973,458 | A | 11/1990 | Newby | |
| 5,180,486 | A | 1/1993 | Smolensky | |
| 5,290,343 | A * | 3/1994 | Morita et al. | 96/39 |
| 5,334,238 | A | 8/1994 | Goodson | |
| 5,591,253 | A | 1/1997 | Altman | |
| 5,683,494 | A | 11/1997 | Altman | |
| 5,885,330 | A * | 3/1999 | Lee | 95/69 |
| 5,904,755 | A * | 5/1999 | Kanazashi et al. | 96/55 |
| 5,961,693 | A * | 10/1999 | Altman et al. | 95/78 |
| 6,032,456 | A | 3/2000 | Easom | |
| 6,372,025 | B1 | 4/2002 | Burlatsky | |
| 6,413,422 | B1 | 7/2002 | Schumacher | |
| 6,790,259 | B2 * | 9/2004 | Rittri et al. | 95/78 |
| 7,156,902 | B1 * | 1/2007 | Altman | 96/53 |

(Continued)

FOREIGN PATENT DOCUMENTS

JP 5-154328 A * 6/1993 ............ 96/61

*Primary Examiner*—Richard L Chiesa
(74) *Attorney, Agent, or Firm*—Carlson, Gaskey & Olds PC

(57) ABSTRACT

An emission treatment system includes a separation device having a vessel that includes an inlet for receiving an emission stream having entrained solid particles. A first outlet from the vessel discharges captured solid particles from the emission stream and a second outlet from the vessel discharges a clean stream having fewer entrained solid particles than the emission stream received into the separation device. A particle collector is fluidly connected with the separation device and includes a collection portion for capturing solid particles from the emission stream.

19 Claims, 6 Drawing Sheets

U.S. PATENT DOCUMENTS 7,615,107 B2 * 11/2009 Burlatsky et al. .............. 96/57
2008/0060518 A1 * 3/2008 Burlatsky et al. .............. 95/58
2008/0060522 A1 * 3/2008 Bertuccioli et al. ............ 96/55

* cited by examiner

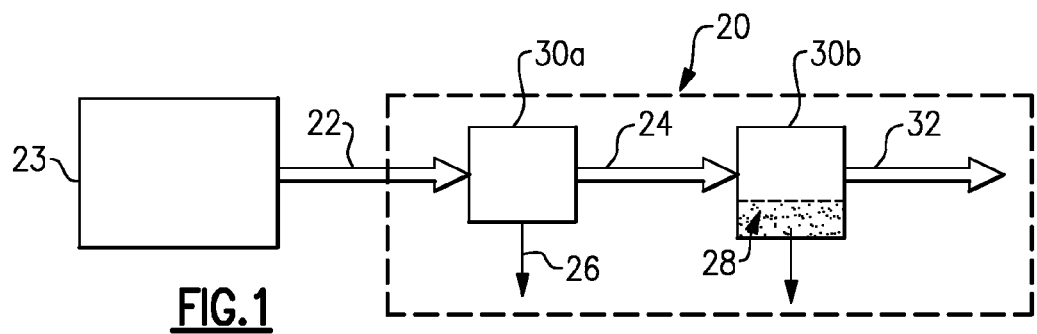
FIG. 1
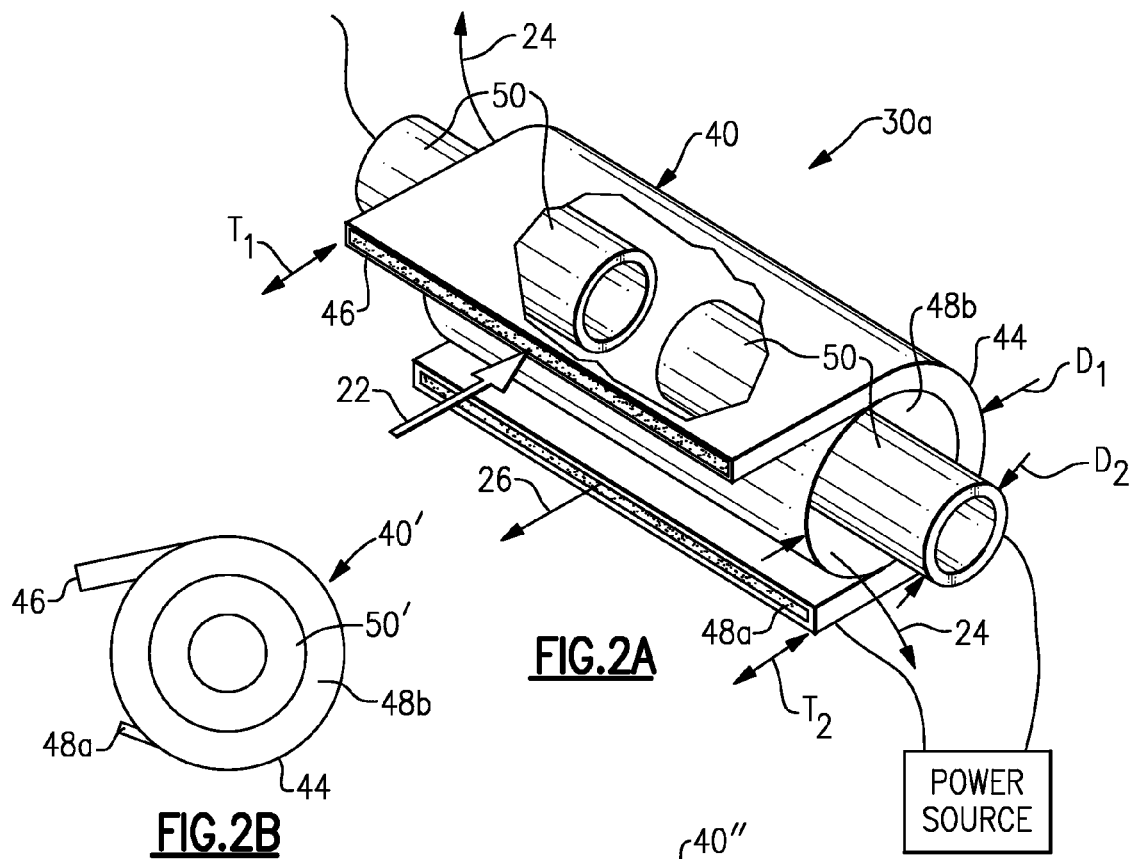
FIG. 2A
FIG. 2B
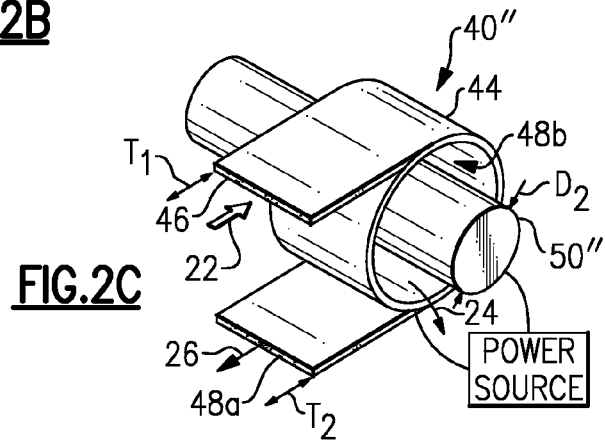
FIG. 2C

US 7,883,558 B2

ELECTROSTATIC PARTICULATE SEPARATION FOR EMISSION TREATMENT SYSTEMS

BACKGROUND OF THE INVENTION

This invention relates to removing particulate from and controlling emissions in a gas stream.

Coal fired power plants, gasification processes, vehicles, and the like typically produce an emission stream as a byproduct. The emission stream generally includes byproduct particles and emission gases containing sulfur, chlorine, mercury, or other pollutants.

A variety of devices exist to purify such emission streams; however, these devices typically have drawbacks. For example, many types of devices significantly obstruct through-flow of the emission stream, thereby resulting in a considerable pressure loss that limits the process or purifying capacity of the device. Some devices also target only one type of emission product in the emission stream, such as certain elemental constituents or certain byproduct particles, while neglecting removal of other emission products. Furthermore, some devices operate inefficiently, are not cost effective, and are not even capable of removing a desirable amount of the emission products. Thus, there is a need for an emission treatment system and method for removing the emission products while providing a relatively low pressure loss. This invention addresses those needs while avoiding the shortcomings and drawbacks of the prior art.

SUMMARY OF THE INVENTION

An example emission treatment system includes a separation device having a vessel that includes an inlet for receiving an emission stream having entrained solid particles. A first outlet from the vessel discharges a discharge stream having captured solid particles from the emission stream. A second outlet from the vessel discharges a clean stream having a lower concentration of entrained solid particles than the emission stream received into the separation device. A particle collector is fluidly connected with the separation device and includes a collection device for capturing solid particles from the emission stream.

In another aspect, an emission treatment system includes a separation device for receiving an emission stream having entrained solid particles and establishing an electrostatic potential to separate the solid particles into a discharge stream to produce a clean stream. A filter device is fluidly connected with the separation device and includes a porous filter element for capturing solid particles from the emission stream.

In another aspect, an emission treatment system includes an inlet for transmitting an emission stream having entrained solid particles and a device having a plurality of separation devices arranged in parallel for receiving the emission stream from the inlet.

An example method of operating an emission treatment system includes the step of controlling a concentration of solid particles within an emission stream received into a particle separator to establish a desired rate of increase of a pressure loss in a downstream collector from a build-up of collected particles.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 1 schematically illustrates selected portions of an example emission treatment system.

FIG. 2A is a perspective view of an example separation device for use in the emission treatment system.

FIG. 2B illustrates another example separation device.

FIG. 2C illustrates another example separation device.

DETAILED DESCRIPTION OF THE PREFERRED EMBODIMENT

Figure 3:
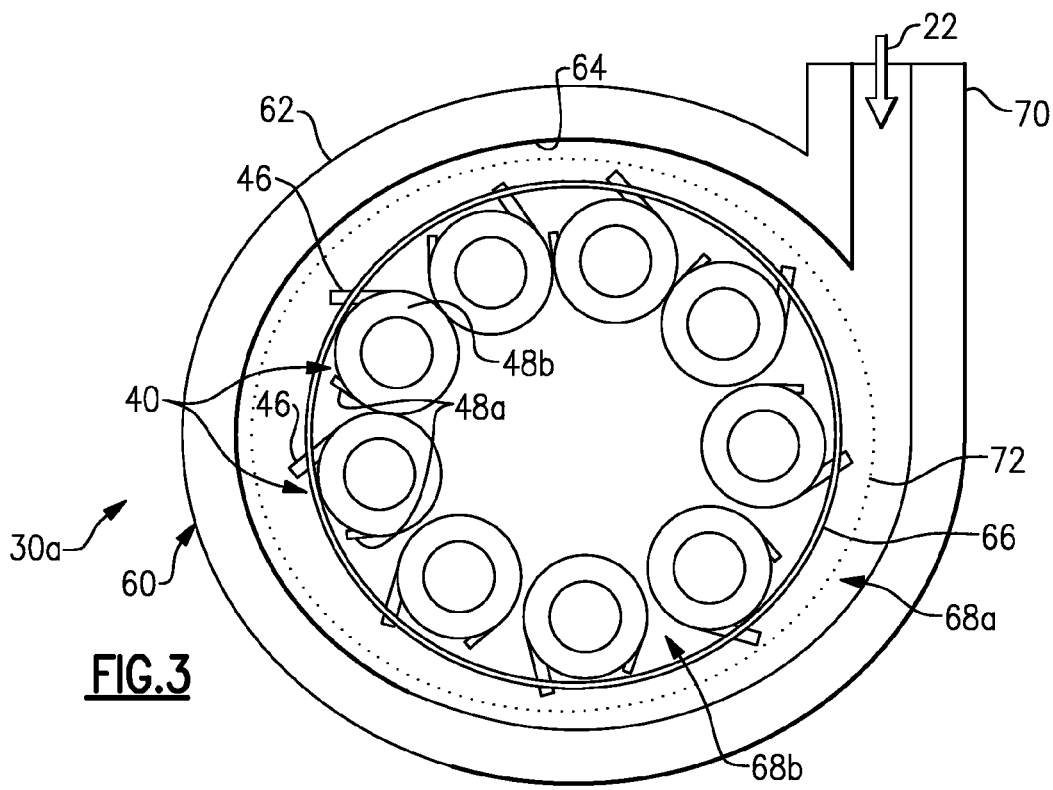
FIG. 3 is another example separation device for use in the emission treatment system.

FIG. 1 schematically illustrates an example emission treatment system 20. In this example, the emission treatment system 20 receives an emission stream 22 from a source 23, such as a coal fired power plant, gasification device, vehicle, or the like. The emission stream 22 includes emission products, such as entrained solid particles and emission gases containing sulfur, chlorine, mercury, $CO_2$ or other pollutants. The composition of the emission stream 22 may vary depending upon the type of source 23 and may include varying types of solid particles and emission gases in varying concentrations. As will be described below, the emission treatment system 20 provides the benefit of efficiently separating at least a portion of the emission products from the emission stream 22 with an added benefit of a relatively low pressure drop.

In the illustrated example, the emission treatment system 20 includes a separation device 30a and a particle collector 30b that cooperate to remove emission products from the emission stream 22. In this example, the separation device 30a receives the emission stream 22 and separates at least a portion of the entrained solid particles from the emission stream 22 to produce a clean stream 24. The clean stream 24 has a lower concentration of entrained solid particles than the emission stream 22. For example, the clean stream 24 may be substantially free of solid particles or may have a residual amount of entrained solid particles. The separation device 30a also produces a discharge stream 26 that includes solid particles that the separation device 30a removed from the emission stream 22.

The clean stream 24 is received into the particle collector 30b, which removes at least a portion of any remaining entrained solid particles in the clean stream 24. The removed solid particles are collected at a collection portion 28 of the particle collector 30b, for example. The particle collector 30b discharges another clean stream 32, which has a lower concentration of solid particles than the clean stream 24 that was received into the particle collector 30b.

By removing entrained solid particles using the separation device 30a as a first removal stage and removing additional solid particles from the clean stream 24 using the particle collector 30b as a second stage, the emission treatment system 20 provides the benefit of removing a greater concentration of the entrained solid particles from the emission stream 22 at a lower pressure drop when compared to prior treatment devices.

Additionally, the separation device 30a alleviates a burden on the particle collector 30b such that the particle collector 84 can be operated in a manner suitable to extend its useful lifetime and thereby reduce a build-up of the removed solid particles at the collection portion 28 that might otherwise cause a greater pressure loss through the particle collector 30b.

FIG. 2A illustrates selected portions of one example of the separation device 30a. In this example, the separation device 30a is a device 40 that includes a substantially cylindrical vessel 44 having an inlet 46 that receives the emission stream 22, a first outlet 48a that discharges the discharge stream 26, and a second outlet 48b that discharges the clean stream 24. Although the example actually shows two second outlets 48b (one at each end), it is to be understood that the example can be modified to include a single second outlet 48b or additional second outlets 48b.

The inlet 46 extends in a substantially tangential direction $T_1$ relative to the cylindrical vessel 44. The first outlet 48a extends in a second tangential direction $T_2$ relative to cylindrical vessel 44. The emission stream 22 flows tangentially through the inlet 46 into the cylindrical vessel 44 and causes the emission stream 22 to swirl within the cylindrical vessel 44 to create a vortex. The vortex produces centrifugal forces on the entrained solid particles that urges these particles toward the perimeter of the cylindrical vessel 44.

In the illustrated example, the second outlet 48b includes a cylindrical tube 50 that extends at least partially within the cylindrical vessel 44. The cylindrical vessel 44 includes a first diameter $D_1$ and may include the cylindrical tube 50 with a second diameter $D_2$ that is smaller than the first diameter $D_1$.

In this example, the tube 50 functions as an electrode and is connected in a known manner to a power source (shown schematically), which is connected also to the cylindrical vessel 44 to create an electrostatic potential (i.e., electric field) between the tube 50 and the cylindrical vessel 44. The electrostatic potential drives the entrained solid particles toward the perimeter of the cylindrical vessel 44, in combination with the centrifugal force that is created by the vortex. Optionally, the entrained solid particles are electrostatically charged using a pre-charger to enhance interaction between the entrained solid particles and the electric field to drive the entrained solid particles toward the perimeter.

Once near the perimeter, the entrained solid particles exit through the first outlet 48a as the discharge stream 26 (i.e., a bleed flow). The emission stream 22, which now has a lower concentration of the entrained solid particles, continues to swirl within the cylindrical vessel 44 and is eventually discharged from the second outlet 48b as the clean stream 24. Although the example shows certain details, one of ordinary skill in the art who has the benefit of this description, will recognize that certain modifications can be made to the separation device 30a to meet their particular needs.

The example device 40 provides the advantage of relatively efficiently separating the entrained solid particles from the emission stream 22 without obstructing the flow of the emission stream 22 to the second outlet 48b, which is one drawback associated with prior devices. This results in a relatively low pressure drop through the device 40. In one non-limiting example, approximately 90% of the total emission stream 22 exits as the clean stream 24 and approximately 10% of the total emission stream 22 exits as the discharge stream 26.

Alternatively, FIG. 2B illustrates a modified device 40' that may be used in place of or in combination with the device 40. The device 40' is similar to the device 40 of FIG. 2A, except for a porous cylindrical tube 50'. The porous cylindrical tube 50' functions as a filter element, and in some examples may effectively replace the particle collector 30b.

Alternatively, FIG. 2C illustrates another modified device 40" that may be used in place of or in combination with the devices 40 and 40'. The device 40" is similar to the device 40 of FIG. 2A, except for a solid cylindrical rod 50" that extends through the cylindrical vessel 44. The rod 50" functions as an electrode as described above and is connected in a known manner to a power source (shown schematically), which is connected also to the cylindrical vessel 44 to create an electrostatic potential (i.e., electric field) between the rod 50" and the cylindrical vessel 44.

FIG. 3 illustrates another embodiment of the separation device 30a that includes a device 60 having a plurality of the devices 40 as shown in FIG. 2A. It is to be understood that the devices 40' and/or 40" of FIGS. 2B and 2C may also be used in place of or in combination with the device 40 in the disclosed examples. In this example, the device 60 includes a housing 62 having a cylindrical inner chamber 64. A cylindrical wall 66 extends axially within the cylindrical inner chamber 64 and separates an outer section 68a from an innermost section 68b. The outer section 68a is fluidly connected with an inlet 70 of the housing 62 that receives the emission stream 22.

The plurality of devices 40 are spaced circumferentially about the periphery of the cylindrical inner chamber 64. Optionally, a pre-charger electrode 72 is also arranged within the outer section 68a of the cylindrical inner chamber 64 between the wall 66 and the housing 62.

In operation, the emission stream 22 tangentially flows through the inlet 70 into the outer section 68a of the cylindrical inner chamber 64. The pre-charger electrode 72 generates an electric field that negatively charges at least a portion of the entrained solid particles within the emission stream 22. When a pre-charger electrode 72 is not used, a wire electrode or other type of electrode may be used to generate the necessary electric field. The emission stream 22 and entrained solid particles are received through the respective inlets 46 of the devices 40. The devices 40 remove the entrained solid particles from the emission stream 22, as described with reference to FIGS. 2A and 2B. However, in this example, the first outlets 48a of the devices 40 discharge into the innermost section 68b, which discharges removed solid particles as the discharge stream 26 as shown in FIG. 2A.

Figure 4:
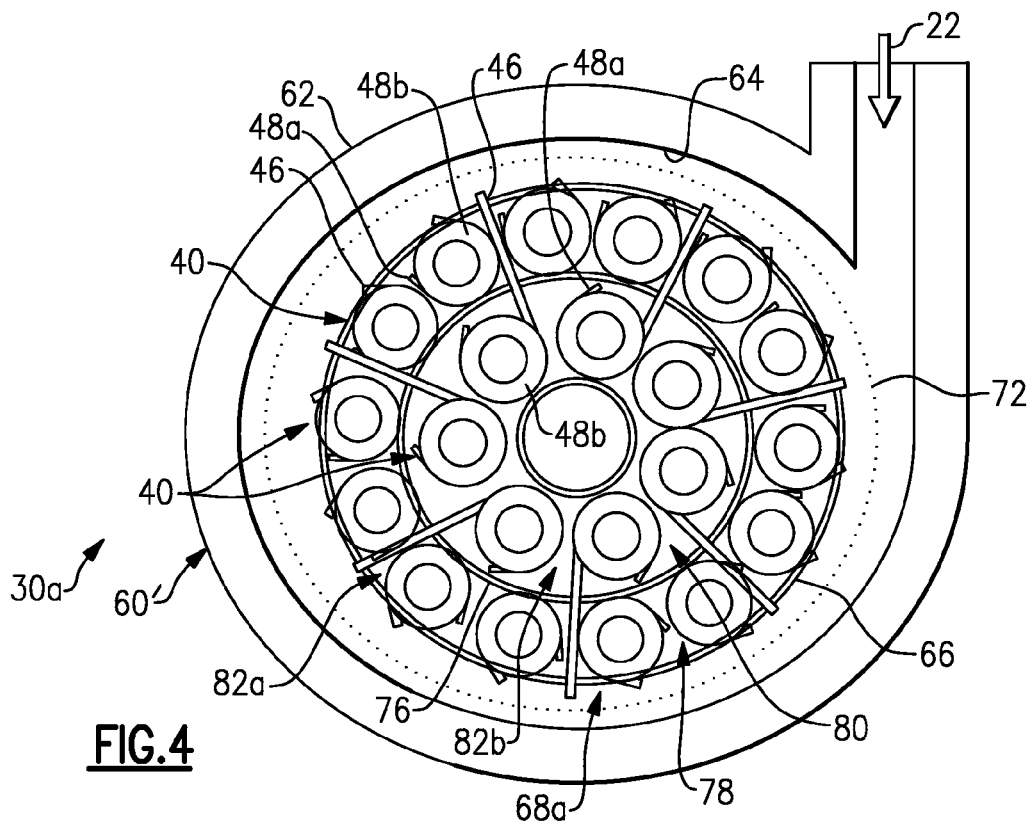
FIG. 4 is another example separation device for use in the emission treatment system.

FIG. 4 illustrates another embodiment of the separation device 30a that includes a device 60' that is somewhat similar to the device 60 of FIG. 3. In this example, the device 60' includes another cylindrical wall 76 that extends axially within the cylindrical inner chamber 64 and separates an intermediate section 78 from an innermost section 80 and the outer section 68*a*.

A first set 82*a* of the devices 40 is located within the intermediate section 78, and a second set 82*b* of the devices 40 is located within the innermost section 80. The inlets 46 of all the devices 40 are fluidly connected with the outer section 68*a* such that the emission stream 22 and entrained solid particles flow into each of the devices 40, which separate the solid particles from the emission stream 22 as described with reference to FIG. 2A. The respective first outlets 48*a* of the first set 82*a* of the devices 40 discharge into the intermediate section 78, and the respective first outlets 48*a* of the second set 82*b* of the devices 40 discharge into the innermost section 80 such that particles discharged into the intermediate section 78 and innermost section 80 are discharged from the device 60' as discharge stream 26. The clean streams produced by each of the separation devices 40 are discharged axially through the respective second outlets 48*b* as the clean stream 24.

Figure 5:
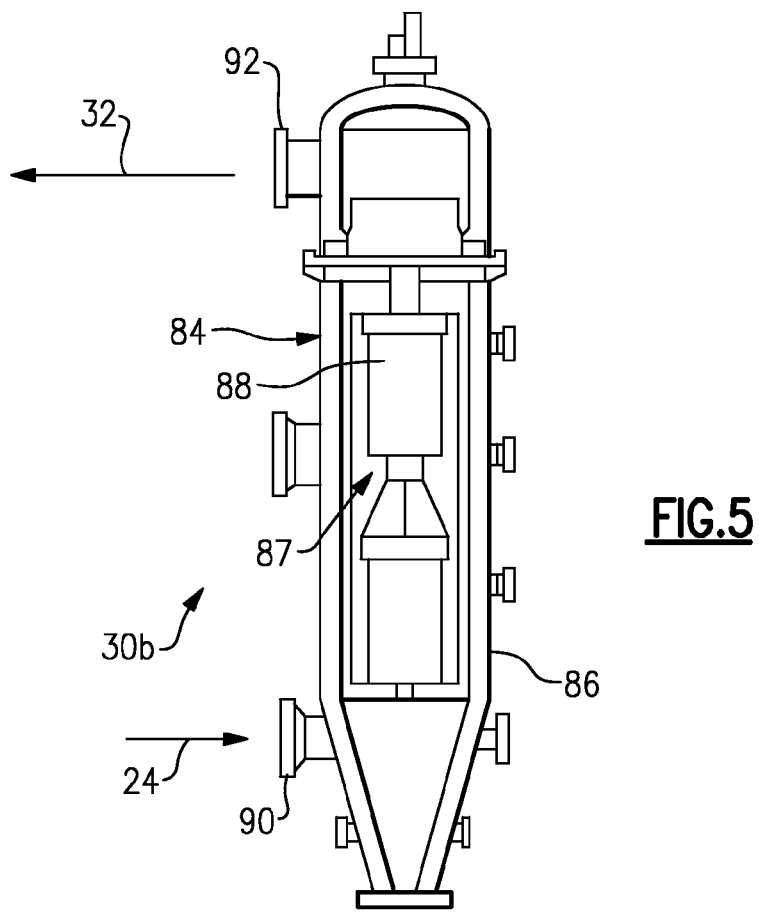
FIG. 5 is an example particle collector for use in the emission treatment system.

FIG. 5 illustrates one example of the particle collector 30*b* of FIG. 1. It is to be understood that the particle collector 30*b* shown in FIG. 5 may be used with any of the previous example separation devices 30*a*. In the illustrated example, the particle collector 30*b* is a candle filter device 84 for removing remaining solid particles within the clean stream 24 received from the separation device 30*a*.

The candle filter device 84 includes a shroud 86 that forms an inner vessel 87. At least one porous filter element 88 is mounted within the vessel 87 for removing the entrained solid particles. For example, the clean stream 24 from the separation device 30*a* is received through an inlet 90 near the bottom of the candle filter device 84. The clean stream 24 moves vertically up through the vessel 87 and through pores of the porous filter element 88. The pores are large enough to permit airflow through the porous filter element 88 but too small to allow the solid particle to flow through. Thus, the porous filter element 88 captures a portion of the remaining solid particles from the clean stream 24.

The clean stream 24 is then discharged from the candle filter device 84 through an outlet 92 as the clean stream 32. It is to be understood that although a certain configuration of the candle filter device 84 is shown, other configurations or types of candle filter devices may alternatively be used.

Using the separation device 30*a* in combination with the candle filter device 84 provides the benefit of reducing a burden on the candle filter device 84 of removing the entrained solid particles from the emission stream 22. For example, in prior systems, candle filter devices are relied upon for removing most of the particles from an emission stream. Heavy reliance leads to a build-up of particles on the filter elements, which obstructs airflow through the filter element and thereby results in a pressure loss. However, in the disclosed emission treatment system 20, removal of at least a portion of the entrained solid particles using the separation device 30*a* upstream from the candle filter device 84 reduces the burden on the candle filter device 84. For example, by reducing the concentration of the solid particles that are received into the candle filter device 84, the build-up of particles within the porous filter element 88 occurs at a reduced rate to thereby decrease the rate of the increase of the pressure loss due to the build-up of the particles. Additionally, the combination of the separation device 30*a* with the candle filter device 84 may provide the benefit of reducing the maintenance requirements for the candle filter device 84. For example, the build-up of particles within the porous filter element 88 is removed using a reverse airflow through the porous filter element 88. This may require, at least to some extent, shut down of the candle filter device 84 for maintenance. By reducing the rate at which the particles build up within the porous filter element 88, the time period between maintenance to remove the build-up of the particles may be extended.

Figure 6:
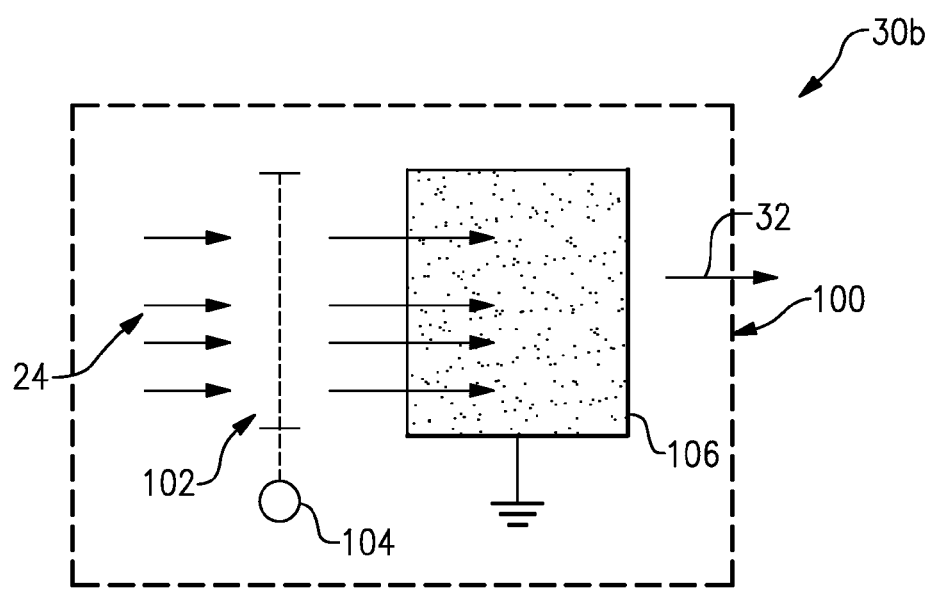
FIG. 6 is another example particle collector for use in the emission treatment system.

FIG. 6 illustrates another embodiment of the particle collector 30*b*. In this example, the particle collector 30*b* is an electrostatic precipitator 100 that includes a charging electrode 102 electrically connected with a power source 104. For example, the charging electrode 102 includes a series of spaced-apart electrical conductors that, when conducting electricity, create an electric field through which the incoming emission stream 22 flows. The electrostatic precipitator 100 also includes a grounded collection portion 106 located downstream from the pre-charger 102, which functions as the collection portion 28 (FIG. 1).

In operation, the emission stream 24 with the entrained solid particles flows through the electric field created by the pre-charger 102. The electric field negatively charges the entrained solid particles, which are then attracted to the grounded collection portion 106 as the emission stream 24 passes across the collection portion 106. The entrained solid particles are thereby captured on the collection portion 106 and removed from the emission stream 22 to produce the clean stream 32. It is to be understood that although a certain configuration and type of the electrostatic precipitator 100 is shown in this example, other configurations or types of electrostatic precipitators may be used.

Figure 7:
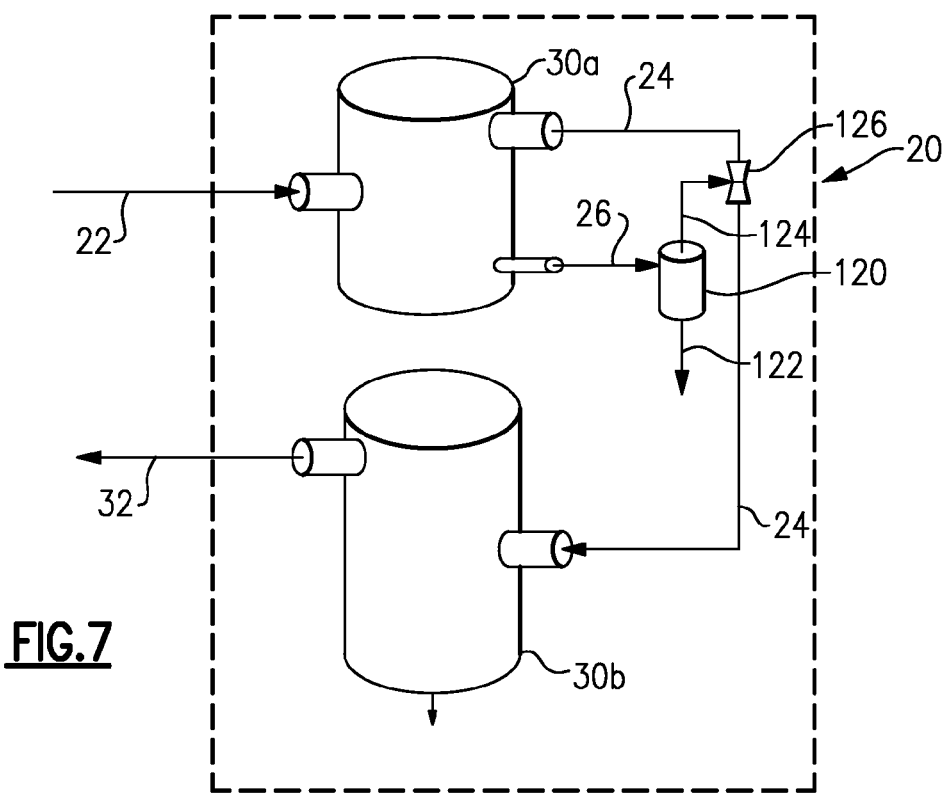
FIG. 7 is an example of the emission treatment system having an additional particle collector.

As can be appreciated, the emission treatment system 20 may be used with a different arrangement of the separation device 30*a* relative to the particle collector 30*b* and/or with various additional features to enhance the operation of the emission treatment system 20. FIG. 7 illustrates one example variation that includes another particle collector 120 between the separation device 30*a* and the particle collector 30*b*. For example, the second particle collector 120 may be a cyclone collector, an electrostatic precipitator, or the like. The second particle collector 120 receives the discharge stream 26 from the separation device 30*a*. The second particle collector 120 separates solid particles from the discharge stream 26 to produce another discharge stream 122 having removed solid particles and a clean stream 124. The clean stream 124 is fed back into the clean stream 24 discharged from the separation device 30*a*. Optionally, a control 126, such as an inductor, controls mixing of the clean stream 124 from the second particle collector 120 into the clean stream 24. The clean stream 24 then continues on to the particle collector 30*b*, as described above.

Figure 8:
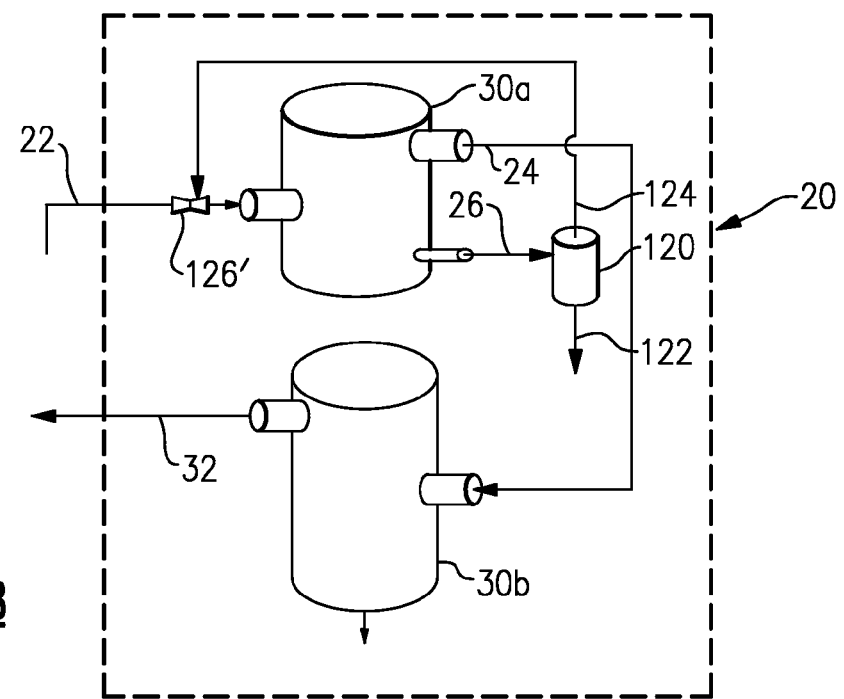
FIG. 8 is example of the emission treatment system having an additional particle collector that circulates a clean stream back into the separation device.

Alternatively, as shown in FIG. 8, the clean stream 124 discharged from the second particle collector 120 is recirculated into the emission stream 22 for another particle-removing cycle through the separation device 30*a*. In this example, the emission stream 22 includes a control 126, such as an eductor, that controls mixing of the clean stream 124 into the emission stream 22.

Figure 9:
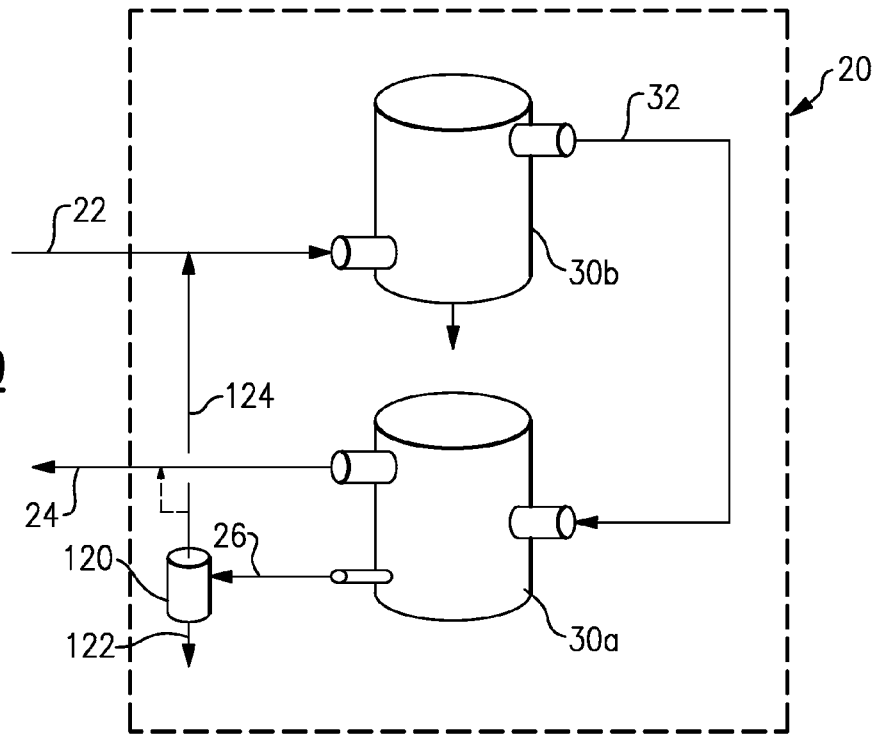
FIG. 9 is an example of the emission treatment system having an additional particle separator and an additional collector that circulates a clean stream back into the separation device.

FIG. 9 illustrates another variation of the emission treatment system 20 wherein the separation device 30*a* is located downstream from the particle collector 30*c*. The emission stream 22 is first received into the particle collector 30*c* to remove at least a portion of the solid particles from the emission stream 22, which then discharges the clean stream 32 into the separation device 30*a*. The separation device 30*a* removes additional solid particles from the clean stream 32 to produce a clean product gas discharged as clean stream 24. Similar to the examples shown in FIGS. 7 and 8, the discharge stream 26 from the separation device 30a may be received into the second particle collector 120. Optionally, the clean stream 124 discharged from a second particle collector 120 may be recirculated into the emission stream 22 for another particle-removing cycle through the particle collector 30b or discharged into clean stream 24. Alternatively, the discharge stream 26 from the separation device 30a may be recirculated into the emission stream 22 without using the second particle collector 120.

Figure 10:
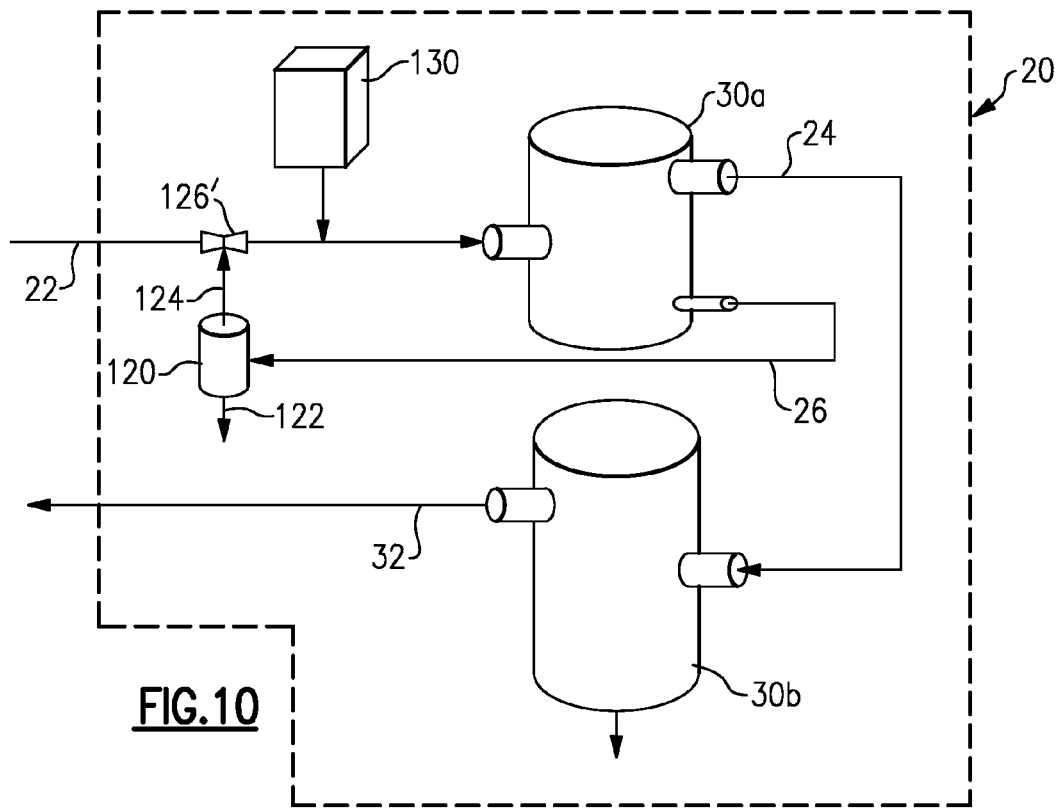
FIG. 10 is an example emission treatment system utilizing a sorbent injection device and a device that circulates a particulate stream including sorbent back into the separation device.

FIG. 10 illustrates another variation of the emission treatment system 20 that is enhanced through utilization of a sorbent material injected into the emission stream 22. In this example, a sorbent injection device 130 injects a sorbent material into the emission stream 22. For example, the sorbent material includes an activated carbon sorbent, a calcium-based sorbent, a magnesium-based sorbent, sodium-based sorbent, or mixtures thereof for capturing emission gases within the emission stream 22. A particular type of sorbent material selected and the ratio in which it is injected into the emission stream 22 may be selected to target particular types of emission gases within the emission stream 22. For example, if it is known that the emission stream 22 includes relatively high levels of mercury, a relatively high amount of activated carbon sorbent may be used as the sorbent material to target capture of the mercury Likewise, other types of sorbent materials may be selected to target other types of emission gases. For example, combinations of sorbent injection and electrostatically enhanced particle separation such as the separation device 30a are shown in further detail in U.S. application Ser. No. 11/517,710, filed Sep. 8, 2006, and now issued as U.S. Pat. No. 7,615,107. One of ordinary skill in the art who has the benefit of this disclosure will be able to select particular types of sorbent materials and ratios to meet their particular needs.

The particle collector 120 receives the discharge stream 26 from separation device 30a and recycles a desired portion of the particulate including the sorbent to the discharge stream 122 through the use of a device such as and eductor or fan. By recycling the sorbent using the particle collector 120 the amount of sorbent required to capture the desired amount of pollutant may be reduced.

Figure 11:
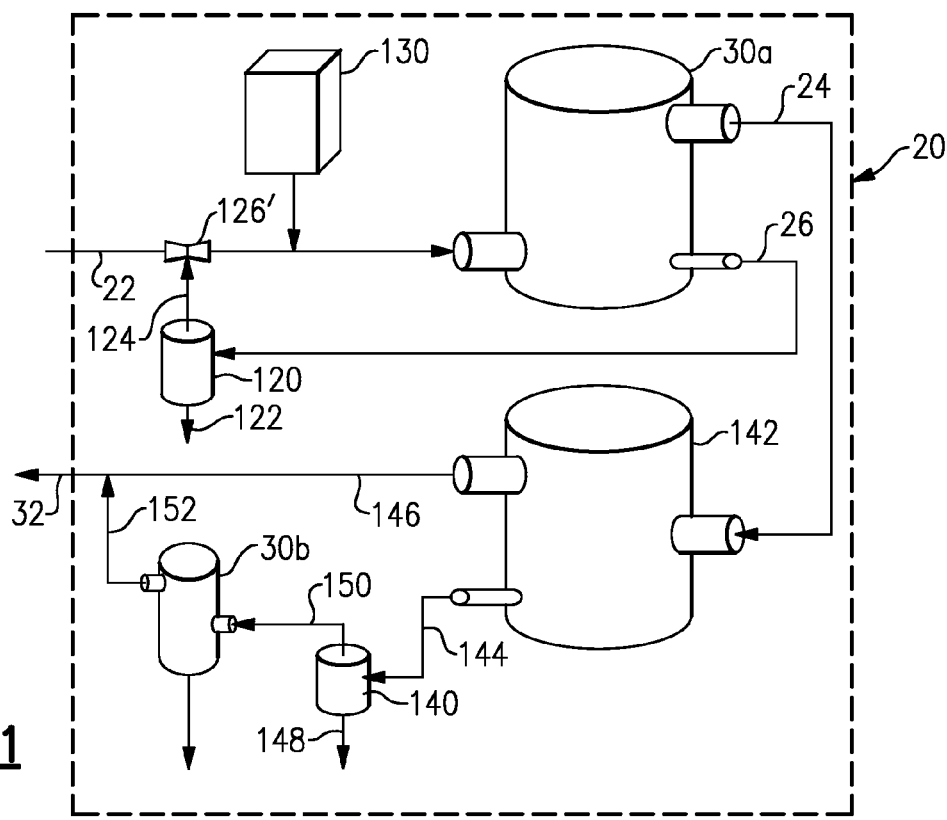
FIG. 11 is an example emission treatment system utilizing a sorbent injection device and a device that circulates a particulate stream including sorbent back into the separation device and an additional separator with several additional collectors.

FIG. 11 illustrates another variation of the emission treatment system 20 similar to the example shown in FIG. 10, except that another particle collector 140 and another separation device 142 are located between the separation device 30a and the particle collector 30b. For example, the separation device 142 includes any of the example devices shown in FIG. 2, 3, or 4, and the particle collector 140 includes the candle filter device 84 of FIG. 5 or the electrostatic precipitator 100 of FIG. 6.

In the illustrated example, the clean stream 24 discharged from the separation device 30a is received into the separation device 142, which separates remaining solid particles from the clean stream 24 into a discharge stream 144 and a clean stream 146. The discharge stream 144 is received into a mechanical collector 140, which removes particles within the discharge stream 144 and discharges the particles as discharge stream 148 to produce a clean stream 150. The clean stream 150 is received into the particle collector 30b, which removes at least a portion of the particles remaining in the clean stream 150 to produce clean stream 32, which is joined with the clean stream 146 from the separation device 142 to form clean stream 32.

The addition of the second separation device 142 and the particle collector 140 along with the sorbent injection device 130 further reduces the burden on the particle collector 30b for removing solid particles from the emission stream 22. In one example, the size and capacity of the particle collector 30b may be reduced. For example, if the particle collector 30b is a candle filter device, fewer porous filter elements may be used. Optionally, the example emission treatment system 20 shown in FIG. 11 may not include the sorbent injection device 130 or the particle collector 120, depending upon the particle removal requirements of the emission treatment system 20.

Figure 12:
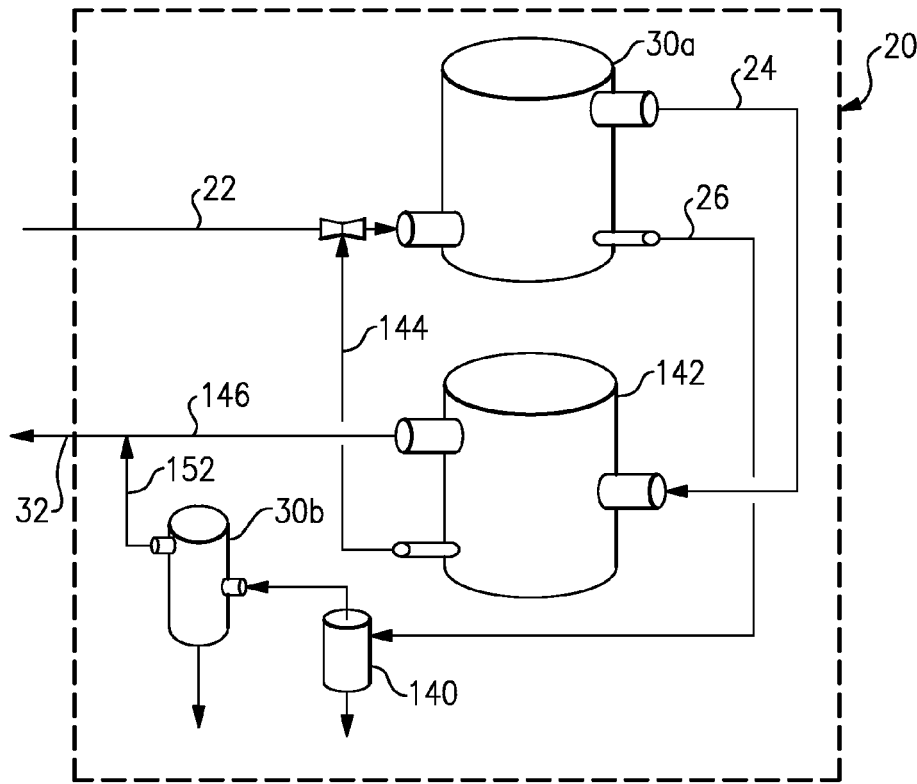
FIG. 12 is an example emission treatment system having an additional separation device, and several additional particle collectors and a device to circulate a dirty stream to the inlet of the first separator.

FIG. 12 illustrates another variation of the emission treatment system 20 that is similar to the variation shown in FIG. 11, except that the discharge stream 26 from the separation device 30a is received into the particle collector 140, the clean stream 24 from the separation device 30a is received into the separation device 142, the discharge stream 144 from the separation device 142 is recirculated into the emission stream 22 for another particle-removing cycle through the separation device 30a, and without the sorbent injector device 130.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An emission treatment system comprising:
   at least one separation device for receiving an emission stream having entrained particles and capturing at least a portion of the entrained particles, the at least one separation device including a vessel having an inlet, a first outlet for discharging a discharge stream having captured particles from the emission stream, and a second outlet for discharging a clean stream from the vessel;
   at least one particle collector in fluid connection with the at least one separation device for removing at least a portion of the entrained particles from the emission stream, the particle collector having a collection portion for receiving removed particles,
   wherein the at least one particle collector includes a first particle collector and a second particle collector, the first particle collector is fluidly connected with the second outlet of the at least one separation device, and the second particle collector arranged to receive the discharge stream from the at least one separation device and discharge another clean stream upon removing at least a portion of the entrained particles in the discharge stream; and
   a flow inductor arranged between the clean stream from the second particle collector and one of the emission stream or the clean stream from the at least one separation device, wherein the flow inductor is operative to selectively control input of the clean stream from the second particle collector into the emission stream or the clean stream from the at least one separation device.

2. The system as recited in claim 1, wherein the at least one separation device further comprises an electrode within the vessel for establishing an electrostatic potential between the electrode and walls of the vessel.

3. The system as recited in claim 2, wherein the second outlet comprises at least one cylindrical member that extends at least partially within the vessel, wherein the vessel is cylindrical and includes a first diameter and the cylindrical tube includes a second diameter that is less than the first diameter.

4. The system as recited in claim 1, wherein the at least one particle collector comprises a candle filter device.

5. The system as recited in claim 4, wherein the candle filter device includes at least one porous filter element.

6. The system as recited in claim 1, wherein the at least one particle collector comprises an electrostatic precipitator.

7. The system as recited in claim 6, wherein the electrostatic precipitator includes at least one electrode for charging the entrained particles, and an electrically grounded collection portion for capturing charged entrained particles.

8. The system as recited in claim 1, wherein the first particle collector includes a candle filter device and the second particle collector comprises a cyclone collector or an electrostatic precipitator.

9. The system as recited in claim 1, wherein the at least one separation device includes a first separation device and a second separation device, and a recirculation line between the first outlet of the second separation device and the inlet of the first separation device.

10. The system as recited in claim 1, further comprising a recirculation line connected with the inlet of the at least one separation device.

11. The system as recited in claim 10, further comprising a particle classifier connected within the recirculation line.

12. The system as recited in claim 1, wherein the at least one separation device is located upstream from the at least one particle collector.

13. The system as recited in claim 1, wherein the at least one separation device is located downstream from the at least one particle collector.

14. The system as recited in claim 3, wherein the at least one cylindrical member is a porous cylindrical tube filter.

15. The system as recited in claim 3, wherein the at least one cylindrical member is a solid cylindrical rod that is electrically connected to a power source.

16. The system as recited in claim 1, further comprising a sorbent injection device upstream of the at least one separation device.

17. The system as recited in claim 16, wherein the sorbent injection device includes a sorbent selected from a group consisting of activated carbon sorbent, calcium-based sorbent, magnesium-based sorbent, sodium-based sorbent, and mixtures thereof.

18. The system as recited in claim 1, wherein the at least one separation device includes a first separation device and a second separation device, the first separation device is arranged to discharge its clean stream to the second separation device and its discharge stream to the second particle collector, and the second separation device is arranged to discharge its discharge stream to a third particle collector arranged between the second separation device and the first particle collector.

19. The system as recited in claim 1, wherein the at least one separation device includes a first separation device and a second separation device, the first separation device is arranged to discharge its clean stream to the second separation device and its discharge stream to a third particle collector arranged between the first separation device and the first particle collector, and the second separation device is arranged to discharge its discharge stream to the inlet of the first separation device.

* * * * *